United States Patent
Batdorf

(10) Patent No.: US 6,881,247 B2
(45) Date of Patent: Apr. 19, 2005

(54) PROTECTIVE BARRIER COATING COMPOSITION

(75) Inventor: Vernon Harland Batdorf, Minneapolis, MN (US)

(73) Assignee: Vernon H. Batdorf, Mpls., MN (US)

( * ) Notice: Subject to any disclaimer, the term of this patent is extended or adjusted under 35 U.S.C. 154(b) by 0 days.

(21) Appl. No.: 10/339,426

(22) Filed: Jan. 9, 2003

(65) Prior Publication Data

US 2004/0134378 A1 Jul. 15, 2004

(51) Int. Cl.$^7$ ............... C09D 5/00; C09D 5/14; C09D 5/18
(52) U.S. Cl. ............ 106/15.05; 106/2; 106/18.13; 106/18.3; 252/601; 252/607; 424/641; 427/389.9; 427/393; 427/393.3; 427/39; 427/396; 427/397; 428/532; 428/537.1; 428/697; 428/703
(58) Field of Search .............. 106/2, 15.05, 18.13, 106/18.3; 252/601, 607; 424/641, 389.9, 393, 393.3, 394, 396, 397; 428/532, 537.1, 697, 703

(56) References Cited

U.S. PATENT DOCUMENTS

| | | | | |
|---|---|---|---|---|
| 4,762,753 A | * | 8/1988 | Perfetti | 428/450 |
| 5,549,869 A | * | 8/1996 | Iwakawa | 422/40 |
| 5,958,463 A | * | 9/1999 | Milne et al. | 424/660 |
| 6,094,857 A | | 8/2000 | Kennedy et al. | 43/132.1 |
| 6,316,016 B1 | | 11/2001 | Iwakawa | 424/409 |
| 6,319,511 B1 | * | 11/2001 | Van Voris et al. | 424/411 |
| 6,322,803 B1 | | 11/2001 | Van Voris et al. | 424/406 |
| 6,370,834 B1 | | 4/2002 | Nickell et al. | 52/741.3 |
| 6,453,628 B1 | * | 9/2002 | Traxler | 52/169.14 |
| 2004/0043686 A1 | * | 3/2004 | Batdorf | 442/123 |
| 2004/0054058 A1 | * | 3/2004 | Baldorf | 524/432 |

FOREIGN PATENT DOCUMENTS

| | | |
|---|---|---|
| EP | 281226 A1 * | 9/1988 |
| JP | 10-323807 A * | 12/1998 |
| JP | 2000-191844 A * | 7/2000 |

OTHER PUBLICATIONS

Derwent Abstract No. 1998–175070, abstract of Japanese Patent Specification No. 10–036591 (Feb. 1998).*

* cited by examiner

*Primary Examiner*—Anthony J. Green

(57) ABSTRACT

The invention is directed to a protective barrier coating composition including a metal borate compound, a zinc compound, magnesium hydroxide, and a water based binder. The invention is also directed to a method of protecting building construction materials from termites and other insects, mold or mildew, and fire or water damage. The composition can be applied onto construction materials by a paint roller, spraying, or brushing, before, during, or after construction.

16 Claims, No Drawings

PROTECTIVE BARRIER COATING COMPOSITION

BACKGROUND

The invention is directed to a protective barrier coating composition that protects buildings from the destructive effects of termites, or other wood destroying insects, as well as mold or mildew, and water or fire damage.

Various methods have been used to protect buildings from being infested with termites, and many more methods used to rid the buildings of termites once infested. These protective methods are all very expensive, have a limited effective life, and use hazardous chemicals to humans and animals. To be effective, a chemical or physical barrier is necessary to eliminate all possible points of entry, preventing any connection between the wood and soil. This requires elaborate equipment and a complicated process needed to be performed by a professional pest control service. Treatment areas include the entire soil area to be covered by concrete, areas adjacent to foundation walls, treatment of footings, back fill outside foundation walls, inside walled areas where there is a crawl space, and any other possible points of entry. The chemicals used are a hazard to handle, and restricted to use by professional applicators. They will only provide protection for about 5 years. This method drenches the soil with liquid termiticide, which is not environmentally friendly. Baiting is another method to control termites. Bait stations are installed underground around the perimeter of the house every 10 to 20 feet and 2 feet out from the house. This method takes considerable time to eliminate a colony of up to one year. It relies upon individual termites feeding on the bait, and returning to the colony to pass the poison on to other members, killing a portion of the exposed colony. Often termites are not attracted to the bait, and can then seek out wood in the building to feed on.

Another method used is to pretreat the wood with chemicals by using pressure to impregnate the wood. Hazardous chemicals like CCA (chromated copper arsenate) or ACZA (ammoniacol copper zinc arsenate) have been used both against termites and fungal decay. Currently zinc borate is available in some composite products, and disodium octaborate tetrahydrate is popular for pretreatment of construction wood. These berates are water-soluble, (zinc borate less so) and can be washed out of the wood from rain on the construction site to some extent. The impregnation is highly dependent upon the density or porosity of the wood or composite material with dense areas obtaining insufficient protection. Pretreatment by impregnation is also expensive adding about $3000 for a typical 2000 square feet house. Zinc borate is known as a smoke suppressant, but has little effect upon lowering the fire spread or heat of combustion. Given the small amount impregnated into the wood, even the smoke suppression is minimal.

Lessor used methods of termite control include adding borates into a mulch that is spread around a house. This is a very short-lived protection with the borates being easily degraded in the soil, and washed away by rain.

Another method disclosed in U.S. Pat. No. 6,322,803 is to spray a structure with a mixture of a quick setting liquid monomer and a pesticide, which forms a bonded polyurethane coating upon curing. The disadvantages of this method outweigh its value since it takes special expensive two component spray equipment, and uses very hazardous isocyanate chemicals. These monomers will very quickly react with any moisture on the wood surfaces forming many carbon dioxide bubbles and pinholes in the film, leaving many entry points for the termites. Urethanes are also very flammable, and give off toxic gases in a fire.

U.S. Pat. No. 6,316,016 also describes a two component urethane system to provide a foamed polyurethane barrier on various construction materials as well as soil. Again, this method uses hazardous isocyanate chemicals as well as flammable and hazardous solvents like Methyl Ethyl Ketone, and a complicated, expensive, two component meter and mix spray equipment. The pesticides used are also hazardous, such as tribulytin compounds, chlordane, phenols, chromium, copper or arsenic compounds. This product is also flammable, and would add considerably to the flame spread and heat evolution in a fire.

U.S. Pat. No. 6,370,834 describes the use of manufactured plastic films or sheets as a barrier, and incorporating a termiticide in the material such as fipionil. The thermoplastic film or sheeting is selected from the group of polyethylene, polypropylene, polyurethane and polystyrene, all of which are very flammable. These materials are claimed to be useable as moisture barriers, but for building external walls breathable materials must be used to prevent condensate from forming within the wall cavity. Gaps or openings in joints would be inevitable, allowing for points of termite passage.

Therefore there remains the need for an effective, long term, simple, safe and inexpensive means of protecting buildings from termites, and other insect damage that is water resistive, while not contributing to the flammability of the building.

SUMMARY

The inventor has discovered a synergistic combination of additives that provides a single, economic and effective solution for imparting fire resistivity, antimicrobial properties, water resistance, and termite or other insect resistance to a protective barrier coating composition.

In one aspect the invention is directed to a protective barrier coating composition comprising a metal borate compound, a zinc compound, magnesium hydroxide, and a water based binder. In another aspect the invention is directed to a method of protecting building construction materials from termites and other insects, mold or mildew, and fire or water damage.

The composition features self-extinguishing and char forming with very little heat, flame or smoke given off in a fire when applied to construction materials, and maintains a char barrier on the surface protecting substrates, e.g. wood from exposure to the flame, and thereby reduces flame spread.

The composition inhibits growth of fungus, mold, mildew or bacteria on its surface for the life of the coating.

The composition upon application provides a barrier against termites and other insects such that they can not eat or break through to the substrates, e.g. wood or other cellulosic based substrates.

The composition contains no hazardous solvents or other chemicals, provides excellent adhesion to a variety of construction materials, and is not adversely affected by water or weather. The composition can be easily applied in a plant, shop or at the construction site by construction workers. It can be applied onto the construction material by a paint roller, spraying, caulking tube or brushing, before, during, or after construction.

These and other features of the invention will be apparent from the following description of the preferred embodiments thereof, and from the claims.

DETAILED DESCRIPTION

The protective barrier coating composition includes a water based binder, magnesium hydroxide, a metal borate, and a zinc compound. The composition may also contain antimicrobial agents, or other paint additives such as thickeners, surfactants, pigments, fillers, dispersants, freeze-thaw stabilizers and coalesants. Preferably the composition contains neither hazardous volatile components nor strong objective odors, and can be applied by non-professionals.

Preferably the composition provides and maintains a barrier of char in a fire, and inhibits flame spread.

The protective barrier coating composition when coated onto substrates, e.g. wood exhibits resistance to termite feeding such that if termites do attempt to feed on the coating, they find it not palatable or causes mortality. The main component used in the coating composition that either causes mortality or makes it not palatable is a metal borate compound. However, it is believed that the magnesium hydroxide and other antimicrobial agents used also contribute synergistically to this protection against termites or other insects. The composition of examples 1 and 2 exhibited a measured termite survivorship of about 15% or less, with substantially no visible signs of termite feeding damage when measured by the Termite Feeding Damage test method.

Examples of useful metal borate compounds include barium metaborate (Buckman Labs Inc.), zinc borates, calcium borate such as Cadycal™ from Fort Cady Minerals, magnesium borate such as Charmax™ FRMB from R. J. Marshall, and where water resistance is of less importance either sodium or potassium borate. An example of sodium borate is Polybor™ from U.S. Borax. An example of potassium borate is Potassium Tetraborate, also from U.S. Borax. The metal borate content is preferably from about 5% to about 50% by weight, more preferably from about 10% to about 30% by weight, and most preferably from about 15% to about 25% by weight, based on the total weight of the composition. Examples of useful zinc borates include grades ZB-112R™, ZB-237™, ZB-467™, and ZB-232™, from Great Lakes Chemical Co., or Firebrake® ZB from U.S. Borax. The metal borates have multiple functions in the composition, e.g. acting as a smoke suppressant, flame retardant, termiticide and secondary antimicrobial agent.

Magnesium hydroxide is preferable used at about 10 to about 50% by weight, more preferably from about 15 to about 35% by weight, and most preferably from about 20 to about 30% by weight, based on the total weight of the composition. A suitable source is MTH 100 from the Dow Chemical Co. The magnesium hydroxide functions synergistically with zinc compounds to promote char formation in a fire, and it absorbs considerable heat of combustion being endothermic. The fire retardancy of magnesium hydroxide and its synergism with zinc borate is shown in Table 1(examples 1,2, and 4) where the composition exhibits a flame spread of about 6.0 inches (15 cm) or less and a burning rate of no greater than about 3.5 inches (9 cm) per minute when measured according to the Fire Resistivity test method. It also functions as a primary antimicrobial by buffering the pH of the dried coating at 8 to 10, thereby creating a hostile environment for microorganisms, which typically need a pH in the range of 6 to 8. Metal borates by themselves are not very effective for inhibiting growth over a broad specimen of fungi strains, or against many bacteria. However, when used along with magnesium hydroxide a synergism is obtained resulting in broad and effective protection. It also makes the composition not palatable for termites and other insects due to the high pH of magnesium hydroxide, which disrupts the acidic digestion. Magnesium hydroxide has a very low water solubility (about 9 ppm at 18 degrees C.), so it would not be washed out of the coating. Although the water solubility of it is low, magnesium hydroxide still can diffuse in sufficient amount to the surface with moisture movement through the coating to maintain a surface concentration of ions for inhibiting microbial growth, and warding off insects.

Calcium hydroxide has been shown to be an effective antimicrobial agent when used in coating, and such coatings were disclosed in U.S. Pat. Nos. 6,280,509 and 6,231,650. However, calcium hydroxide has a very high pH (12.4) and water solubility (0.185 grams/100 grams water). The water-based coatings described in these patents likewise has a final pH of over 12. At that high pH, it will cause alkali burns and skin rashes for the applicator from over-spray mist or inadvertent contact. The coating also has been found to carbonate quickly from carbon dioxide in the air, and loose its antimicrobial property after 1 to 6 months aging. In contrast, coatings made with magnesium hydroxide have been shown to not form any carbonate on their surface even after several years of service, and thereby retain its antimicrobial and termite resistive properties. Coatings made with the magnesium hydroxide have a much milder alkalinity (less than 10.0 pH), and are only mildly irritating to the skin even on overexposure.

The water based binder includes at least one polymer. Suitable water based binders for the protective barrier coating composition include polyvinyl acetate emulsions, terpolymers of vinyl acetate-vinyl chloride-ethylene emulsions, flexible ethylene-vinyl chloride copolymer emulsions, styrene butadiene rubber emulsions, vinyl acrylate or acrylic copolymer emulsions, 100% acrylic, styrene acrylic emulsions, chloroprene emulsions, silicone resin dispersions, and combinations thereof. Examples of the water based binders include Airflex® 500, 809, 728 or 4500 from Air Products, Flexbond® 670,675,325 or 381 from Air Products, Styrofan® ND 565 or 422 from BASF, Neoprene 115 from Dow—DuPont, and PD 449, 124, 3823H from H. B. Fuller Co. These and other polymer emulsions can be used as long as they provide good wetting and adhesion to the construction materials, have good binding properties for the inorganic components, good film formation at application temperatures, and good water resistance for the dried film. For a fire resistive composition that is self-extinguishing, the polymer content from the water based binder needs to be kept as low as possible in the dried film. It is preferred that the polymer content be from about 5% to about 40% by weight, more preferred from about 6% to about 30%, and most preferred from about 6% to about 25% of the total dry weight. The composition may include other additives such as dispersants, surfactants, thickeners, pigments, defoamers, biocides, cross-linkers, plasticizers, coalescants, and adhesion promoters. The choice of these additives is dependent upon the particular application method, service requirements, manufacturing methods, and chosen components, each used as chosen by one skilled in the art of formulating paints, coatings, adhesives or sealants. Particularly beneficial plasticizers are the liquid chlorinated paraffins, which can also act as fire retardants. Useful plasticizers include Paroil® 1650, 53-NR, 58-NR, or 1160 from Dover Chemical Co. These are preferred to be used at about 10 to about 100parts per 100 parts polymer, more preferred at about 15 to about 75 parts per 100 parts polymer, and most preferred at about 25 to about 50 parts per 100 parts of polymer.

The coating composition can be used on construction material surfaces comprising wood, wood composites, gypsum wall board, cellulosic insulation, cement or cement composites, concrete blocks, ceiling tiles, or other synthetic materials normally known and understood by persons skilled in the art who work in the construction industry. The coating has been found to provide good barrier properties at a coverage rate of about 100 to about 600 square feet per gallon.

At higher coverage rates the film thickness becomes insufficient for good fire protection of the substrate, and limited protection against termites, and some molds. Higher coverage rates are obtainable with excellent protection against molds and fungus if other antimicrobial agents are added. Preferred antimicrobial agents include those of low water solubility (<0.1% by weight) and low vapor pressure so substantially non-volatile, and those that do not add any hazards to the product's use. Examples of antimicrobials include Zinc Omadine® or IPBC-40 from Arch Chemical, Amical® Flowable from Dow Chemical, and Rozone ™2000 from Robin & Haas. These may be used typically at about 0.2% minimum to the maximum allowed by the EPA.

The invention will now be described further by way of the following examples. All percents stated in the Examples are by weight unless indicated otherwise.

EXAMPLES

Test Procedures

Test procedures used in the examples include the following:

Termite Feeding Damage Test Method

Termites are exposed to wood blocks (7.5×9×2-cm, L:H:W) coated with the protective barrier coating composition to be tested. The blocks are placed in 15 cm diameter plastic Petri dishes lined with a sand and vermiculite mixture to maintain sufficient moisture for termite survival. A population of 650 termites is placed in each Petri dish for up to two weeks. At the end of the test the number of termites still alive are counted and the blocks visually examined for evidence of termite feeding damage.

Fire Resistivity Test Method

A smooth pine board about 11 inches (28 cm) by 3½ inches (9 cm) by ¾ inches (2 cm) is coated with the protective barrier coating composition using a 3 inch (1.6 cm) wide draw down bar at the desired coverage rate, using a wet film thickness gauge to measure its thickness. After at least 4 days dry time at ambient conditions it is marked with lines every inch of length, starting with zero at one inch from the end, where the flame will be placed directly under the zero mark. The coated board is mounted at a 45° inclined angle in a draft-free exhaust hood, with a propane fueled Bunsen burner placed about 1½ inches (4 cm) below the board surface at the lower end, directly below the zero line, and adjusted to have about a two inch (5 cm) flame. When placed under the board with the coated side face down, the flame initially bends up to about the one inch line. A stopwatch is used to record the maximum flame speed every 15 seconds through the first three minutes, and every 30 seconds for the last two minutes of the five minute testing time. Results reported include the maximum flame spread, the flame spread rate up to the maximum flame spread, the char length, and if any after-glow or continued burning after removal of the burner at five minutes. One may also note how much visible smoke is developed, if any sparks, popping, or fall off occurs, or depth of char into the surface.

Fungal Resistance Test Method

ASTM D-5590 is a test procedure for testing paints or coatings for resistance to growth of various fungus on it surface. The method uses a potato dextrose agar nutrient. The test specimens are set on the agar in petri dishes and inoculated with a fungal culture of *Aspergillus Niger* (ATCC 6275), *Penicillium funiculosum* ATCC 17797), and *Aureobasidium pullulans* (ATCC 9348). The specimens are incubated at 28 degrees C. under 85% to 90% relative humidity for 4 weeks, and noted for visual growth. Rating is 0 for none, 1 for a trace of growth (<10% over surface), 2 for light growth (10%–30%), 3 for moderate growth (30%–60%), and 4 for heavy growth (60% to complete coverage).

EXAMPLES

| Components | 1 | 2 | 3 | 4 |
|---|---|---|---|---|
| Water | 29.2 | 28.2 | 31.3 | 29.2 |
| Cellulosic Thickner | .3 | .2 | .3 | .3 |
| Nonionic Surfactant | .5 | .5 | .3 | .5 |
| Anionic Dispersant | .8 | — | .9 | .8 |
| Zinc Oxide | 4.0 | 3.0 | — | 4.0 |
| Titanium Dioxide | 2.0 | 2.0 | — | 2.0 |
| Magnesium Hydroxide | 23.0 | 20.0 | — | 23.0 |
| Zinc Borate | 18.0 | 15.0 | 10 | — |
| Calcium Borate | — | — | — | 18.0 |
| Oil Based Defoamer | .2 | .3 | .3 | .2 |
| Vinyl Acetate Ethylene Emulsion (55% solids) | 21.0 | 29.0 | 30.0 | 21.0 |
| Silane Adhesion Promoter | .2 | — | — | .2 |
| Urethane Thickener | .8 | .6 | — | .8 |
| Amical Flowable (40% solids) | — | 1.2 | — | — |
| Hydrated Alumina | — | — | 26.0 | — |
| Ethylene Glycol | — | — | .9 | — |
| Total | 100 | 100 | 100 | 100 |

All four examples were made on a high shear cowles type lab mixer, with components added in order listed. All were 3000–6000 cps in viscosity as measured on a Brookfield Viscometer at 20 RPM at 75° F. (24° C.). The pH was 9.0–9.5. Test results are shown in table 1.

TABLE 1

| | Example No. | | | | Uncoated Pine |
|---|---|---|---|---|---|
| | 1 | 2 | 3 | 4 | |
| ASTM D-5590 Rating Uncoated | — | — | — | — | 4 |
| 400 ft2/gal over oak veneer | 0 | 0 | 3 | 1 | — |
| 600 ft2/gal over drywall paper | — | 0 | — | — | — |
| Fire Resistivity, 100–125 ft2/gal | | | | | |
| a) Average burning rate, inches (cm)/minute | 2.4 (6) | 2.8 (7) | — | 3.45 (8.8) | 4.0 (10) |
| b) Maximum flame spread, inches (cm) | 4.5 (11.4) | 4.5 (11.4) | — | 6.0 (15) | 7.0 (17.8) |
| c) char length inches (cm) | 4.0 (10) | 4.0 (10) | — | 5.5 (14) | 6.0 (15) |
| Termite Feeding Damage | | | | | |
| Average survivorship | 2% | 7% | — | — | 100% |
| Feeding damage, visual | none | none | — | — | major |

I claim:

1. A protective barrier coating composition comprising a water based binder, from about 5% to about 50% by weight of a metal borate compound, zinc oxide, and magnesium hydroxide.

2. The protective barrier coating composition of claim 1, wherein the metal borate compound comprises zinc borate, barium metaborate, magnesium borate, calcium borate, potassium tetraborate or sodium borate.

3. The protective barrier coating composition of claim 1, wherein the water based binder is selected from the group consisting of vinyl acetate-ethylene emulsions, vinyl acrylic or acrylate-acrylenitrile copolymer emulsions, styrene acrylic emulsions, styrene butadiene rubber emulsions, acrylic homopolymer emulsions, ethylene-vinyl chloride copolymer emulsions, vinyl acetate-vinyl chloride-ethylene terpolymer emulsions, urethane-acrylic hybrid dispersions, polyvinyl acetate emulsions, chloroprene emulsions, silicone resin dispersions, and combinations thereof.

4. The protective barrier coating composition of claim 1, wherein the composition exhibits a fungus resistance rating of no greater than 1 (one) when measured according to test method ASTM D-5590.

5. The protective barrier coating composition of claim 4, wherein the composition exhibits a flame spread about 6 inches (15cm) or less and a burning rate of no greater than about 3.5 inches (9 cm) per minute when measured according to the Fire Resistivity test method.

6. The protective barrier coating composition of claim 4, wherein said composition exhibits a measured termite survivorship of about 15% or less, with substantially no visible signs of termite feeding damage when measured by the Termite Feeding Damage Test Method.

7. The protective barrier coating composition of claim 1, wherein the metal borate comprises zinc borate.

8. The protective barrier coating composition of claim 1, wherein the water based binder includes at least one polymer, the content of the polymer being from about 5% to about 40% by weight.

9. The protective barrier coating composition of claim 8, wherein the content of the polymer is from about 6% to about 25% by weight.

10. The protective barrier coating composition of claim 1, comprising about 10% to about 30% by weight of a metal borate, about 15% to about 30% by weight of magnesium hydroxide, and about 2% to about 30% by weight of zinc Oxide.

11. The protective barrier coating composition of claim 1, wherein the metal borate is calcium borate.

12. A method of protecting building construction material with a protective barrier coating composition of claim 1, comprising applying the composition onto at least one surface of the construction material.

13. The method of claim 12, wherein the construction materials comprise wood, wood composites, gypsum wall board, cellulosic insulation, cement or cement composites, concrete blocks, or ceiling tiles.

14. The method of claim 12, wherein the metal borate is zinc borate.

15. The method of claim 12, wherein the metal borate is calcium borate.

16. An article comprising a construction material and a layer of a protective barrier coating composition of claim 1 that is coated on the construction material.

* * * * *